Patented Apr. 4, 1950

2,503,193

UNITED STATES PATENT OFFICE 2,503,193

USE OF MIXED VAPORS TO CONTROL FOOD STERILIZATION TEMPERATURE

Oren Carlyle Cessna, Ann Arbor, Mich., assignor to The Dow Chemical Company, Midland, Mich., a corporation of Delaware No Drawing. Application August 21, 1948, Serial No. 45,558

5 Claims. (Cl. 99—214)

1

This invention relates to an improved method of controlling the temperature of sterilization of canned food through the use of the vapors from a boiling mixture of organic liquids, one of which boils below and the other of which boils above the desired sterilization temperature. It relates in particular to such a use of a mixture of trichloroethylene and perchloroethylene, the constituents of which boil, respectively, at 87° and 121° C. at normal atmospheric pressure.

The food canning industry uses various means for obtaining sterilizing temperatures in freshly canned food. Principal among the methods employed are batch sterilization with steam in huge autoclaves and continuous sterilization with steam in special and expensive equipment fitted with intricate valves to admit the cans to the pressure zone and to discharge them therefrom without loss of steam pressure. The batch autoclave process requires too much time and handling of the cans, while the continuous method requires too expensive equipment. It would be highly desirable to effect the sterilization continuously and at atmospheric pressure.

Proposals have been made to effect the sterilization in the vapor of an organic liquid. This has presented several problems. Thus, each food is ideally sterilized and cooked at a specific and characteristic temperature, which is usually between 212° and 275° F. (100°–135° C.) and most commonly below 240° F., but which may be as low as 195° F. Hence, if the vapors of an organic liquid were to be used for cooking and sterilizing the canned food, one of two undesirable alternatives are encountered except in those rare instances in which the condensing temperature of the organic vapor happens to be the desired temperature of sterilization. If the condensing temperature of the vapor is higher than the necessary temperature of sterilization, the packed food is prone to become overcooked, and may be adversely affected by the high temperature encountered in the vapor zone. If the condensing temperature of the vapor is lower than the optimum sterilization temperature, a prolonged exposure is required to effect any necessary cooking, and there may be no effective sterilization. Relatively few organic compounds can be found with atmospheric boiling points in the desired range, and these compounds differ widely in their chemical behavior, many of them being corrosive to the tin cans or to the sterilization equipment, and many being toxic to humans and dangerous for use in a canning factory. For these and other reasons, the use of a single condensing organic vapor at atmospheric pressure has been found to be of too limited utility for general acceptance in the canning industry.

It is an object of the present invention to provide a method whereby canned food may be sterilized, and cooked if desired, in condensing organic vapors at atmospheric pressure at the desired and optimum temperature. A related object is to provide such a method, controllable as to temperatures between 195° and 240° F. (about 90° to 115° C.), and employing organic vapors which are non-injurious to the cans or to the sterilizing equipment. A particular object is to provide such a method, controllable as to temperatures from 195° to 240° F., using vapors from a pre-selected mixture of trichloroethylene and perchloroethylene. Other and related objects will appear hereinafter.

It has now been found that ideal sterilization and cooking of canned foods may be obtained by exposing the canned foods to the mixed vapors of two organic liquids, one of which boils below and the other of which boils above the desired sterilization temperature, in proportions such that the initial condensation temperature of the mixed vapors is the desired treating temperature, and under conditions such that the normal tendency for the mixed vapor composition to change and for the condensation temperature to decrease is overcome.

It is known that the boiling point, and hence the initial vapor condensation temperature of a non-azeotropic mixture of volatile liquids is intermediate between the respective boiling points of the two individual liquids, and that the specific boiling and condensing temperature depends on the ratio of the liquids in the mixture.

It is also known that, when the vapors from a boiling mixture are gradually condensed on surfaces increasingly remote from the source of vapor, the uncondensed vapors at each succeeding point are richer in the lower boiling constituent and the condensing vapor temperature gradually drops as increasing proportions are condensed so that the remote surfaces are subjected to a lower temperature than those near the source of vapor. If such a normal condition were applied to the heating of canned foods, control over the sterilizing conditions would be lost gradually, cans at various levels in the vapor zone would be heated to different temperatures, and, after such cans were heated to a temperature above the boiling point of the more volatile liquid, they would no longer be effective as vapor condensers and the uncondensed vapors of the lower boiling constituent would accumulate in the vapor zone, decreasing the temperature therein.

The normal tendency for the mixed vapor composition to change and for the condensing temperature to decrease is overcome by supplying heat to the boiling liquid at such a rate in excess of the combined heat loss due to radiation from the apparatus and that absorbed by the canned goods in the sterilizing zone, that the mass velocity of the vapor at all points in the sterilizing zone exceeds a critical value below which normal vapor-liquid equilibrium will tend to be established. The amount of excess heat required can be minimized by selecting suitable dimensional proportions for the sterilizing zone, a long narrow shape being more suitable than a short one of large cross section. Since the critical velocity will vary with the individual design, no general value can be assigned. The desired result depends not only on the stated rate of heating and the consequent mass velocity of vapor in the sterilizing zone, but also on the use of cooling means beyond the sterilizing zone, to condense all vapor and to return the condensate quickly to the main supply of boiling liquid. The vapor is prevented from approaching equilibrium by the high rate at which it is generated and passed through the sterilizing zone, and is fully condensed in a brief time interval, partly by the cans being sterilized and by radiation from the apparatus and partly by cooling means beyond the sterilizing zone. The latter cooling means may consist of a suitable arrangement of cans being preheated, water-cooled or air-cooled walls or coils, or a combination thereof. Thus, the cans may be preheated while serving to condense the lower temperature vapors remote from the source of vapor supply. The preliminary stages of cooking occur as the cans are lowered to the sterilizing zone, and final sterilization occurs in the latter zone after the contents of the can have reached the initial condensation temperature of the mixed vapors. The canned food may be subjected to the three stages of the process in either a batch or a continuous operation, through simple variations in the apparatus employed.

Sterilization temperatures in the range most commonly required, between 195° and 240° F. (90°–115° C.) may be obtained conveniently in the vapors of a mixture of trichloroethylene (boiling point 87° C.) and perchloroethylene (boiling point 121° C.). Temperatures in excess of the boiling point of perchloroethylene can be obtained by other mixtures such as perchloroethylene and o-dichlorobenzene (boiling point 180° C.) and uniform temperatures may be maintained in the sterilizing zone in the manner described. The following table gives the analysis of the liquid mixtures of these materials having the listed boiling points or initial condensation temperatures.

*Table I*

| Boiling Temperature, °C. | Composition of Liquid | | | |
|---|---|---|---|---|
| | Per Cent by Volume | | Mol Fraction | |
| | Trichloroethylene | Perchloroethylene | Trichloroethylene | Perchloroethylene |
| 121 | 0 | 100 | .000 | 1.000 |
| 118 | 4 | 96 | .045 | .955 |
| 116 | 8 | 92 | .090 | .910 |
| 114 | 12 | 88 | .135 | .865 |
| 112 | 17 | 83 | .189 | .811 |
| 110 | 21 | 79 | .232 | .768 |
| 108.5 | 25 | 75 | .275 | .725 |
| 108 | 26 | 74 | .286 | .714 |
| 106 | 31 | 69 | .339 | .661 |
| 104 | 36 | 64 | .392 | .608 |
| 102 | 41 | 59 | .441 | .559 |
| 100 | 47 | 53 | .502 | .498 |
| 99 | 50 | 50 | .533 | .467 |
| 98 | 53 | 47 | .562 | .438 |
| 96 | 59 | 41 | .621 | .379 |
| 94 | 66 | 34 | .688 | .312 |
| 92 | 75 | 25 | .773 | .227 |
| 90 | 83 | 17 | .847 | .153 |
| 88 | 94 | 6 | .948 | .052 |
| 87 | 100 | 0 | 1.000 | .000 |

Particularly effective for most food cooking and sterilizing are those mixtures containing from 12 to 41 per cent trichloroethylene, boiling in the range from 114° to 102° C.

When the material to be cooked and sterilized requires a temperature near 107°–108° C. for optimum treatment, an appropriate liquid mixture used to maintain such a temperature in the vapor zone is one consisting of about 75 parts by volume of perchloroethylene and about 25 parts by volume of trichloroethylene. To illustrate the effects, both of the rate of flow of vapor and of the rate of heat input, upon the temperature of the vapor, this mixture was boiled in an open upright cylindrical vessel of about 1 square foot in cross-sectional area.

As the vapor rose in the vessel, radiation from the walls caused partial condensation so that increasing proportions of the generated vapors had been condensed at successively higher levels. The proportion of vapor condensed by a given section of the walls was varied by varying the rate of heat input, and complete reflux was provided by a copper coil, carrying cold water, located in the extreme upper part of the vessel. It was found that, instead of immediately decreasing, the condensing temperature remained relatively constant (within 1° C.) for a considerable distance above the liquid and then decreased rapidly at the higher levels. The height to which the condensing temperature remained constant varied with the rate of heat input. Since the actual heat input will vary with the size (both the exposed area of boiling liquid and the height above the liquid level) of the sterilizing vessel, the extent of any radiation losses from the vessel, and other variable but calculable factors, the results obtained in the reported tests are given here in relative rather than absolute terms. The temperatures are given in degrees, centigrade.

*Table II*

| Heat Input, relative units: Height above boiling liquid, relative units | 1.0 Temperature | 0.9 Temperature | 0.7 Temperature | 0.5 Temperature |
|---|---|---|---|---|
| 0 | 108.5 | 107 | 107 | 106 |
| 1 | 108 | 106.5 | 106 | 103.5 |
| 2 | 108 | 106.5 | 104 | 99.5 |
| 3 | 107.8 | 106 | 102 | 95.5 |
| 4 | 107.5 | 106 | 100 | 92 |
| 5 | 107.5 | 105 | 98 | 88 |

To further illustrate the limiting conditions, the percentage of the vapor that had been condensed by radiation up to each level was calculated for each rate of heat input, and the mass velocity of residual vapor at each level was ascertained by difference. These data are presented in Table III, along with the observed decrease in temperature between the boiling liquid and the corresponding level in the vapor space. The theoretical decrease in temperature, when the same proportion of vapor is condensed with the vapor in equilibrium with each increment of condensed liquid, is also given. In the tests, the temperature remained relatively constant and the rate of temperature decrease was less than the theoretical in the portions of the vessel where the mass velocity of vapor exceeded a particular value which is approximately the same for each rate of heat input, and the rate of temperature decrease became rapid and greater than the theoretical when the mass velocity was less than the particular value. On the basis of the theoretical values, a temperature decrease of less than one degree can be maintained if sufficient vapor is supplied so that less than 16 per cent of it is condensed in the sterilizing zone. In many cases this would create an undue heat consumption but, by utilizing the principles here set forth, much larger proportions of the vapor can be condensed at a constant temperature. The exact percentage depends on the relation between the heat load and the cross-section of the equipment. Thus, in the example given, 50 per cent of the vapor can be condensed and the temperature can be maintained within one degree in the space where the mass velocity remains greater than 21 pounds per square-foot-hour. The necessary excess heat input (over and above radiation and heat absorption by canned goods in the constant temperature zone) to create this mass velocity of vapor throughout, and at the exit from any given zone, is easily calculable.

cooking and sterilizing temperature. The condensation of vapor would then decrease at the can surfaces and would increase on the internal cooling coils in the upper walls of the vessel. At the conclusion of the required sterilization period, the cans are withdrawn from the vessel, a new group may be lowered into the vapor zone, and the process may be repeated.

More practical and economical, however, is a continuous process wherein the cans are passed horizontally through the upper vapor level, just below the cooling coils, then are caused successively to traverse the vessel at lower and lower levels in the vapor zone at a rate such that their period of residence in the vapor, after the cans have reached the sterilization temperature, is the period necessary to effect a safe sterilization without overcooking the contents.

Similar results can be obtained with an extended horizontal chamber through which the vapors are passed longitudinally from an inlet at Table III

| Heat Input, Relative Per Cent of Vapor Condensed | 1.0 | | 0.9 | | 0.7 | | 0.5 | | Theoretical Temp. Dec. |
|---|---|---|---|---|---|---|---|---|---|
| | Temperature Decrease | Vapor Velocity | Temp. Dec. | Vap. Vel. | Temp. Dec. | Vap. Vel. | Temp. Dec. | Vap. Vel. | |
| 0 | 0 | 35 | 0 | 31 | 0 | 24 | 0 | 17 | 0 |
| 9 | | | 0.5 | 28 | | | | | 0.5 |
| 11 | 0.5 | 31 | | | | | | | 0.7 |
| 14 | | | | | 1.0 | 21 | | | 0.8 |
| 20 | 0.5 | 28 | | | | | 2.5 | 14 | 1.4 |
| 22 | | | 0.5 | 24 | | | | | 1.7 |
| 30 | | | | | 3.0 | 17 | | | 2.3 |
| 32 | 0.7 | 24 | 1.0 | 21 | | | | | 2.6 |
| 37 | | | | | | | 6.5 | 11 | 3.2 |
| 40 | 1.0 | 21 | | | | | | | 3.6 |
| 42 | | | | | 5.0 | 14 | | | 4.0 |
| 45 | | | 3.0 | 17 | | | | | 4.3 |
| 52 | 1.0 | 17 | | | | | | | 5.5 |
| 55 | | | 4.5 | 14 | 7.0 | 11 | 9.5 | 8 | 6.0 |
| 62 | | | | | 9.0 | 9 | | | 7.8 |
| 72 | | | | | | | 14.0 | 5 | 10.6 |
| 88 | | | | | | | 18.0 | 2 | 17.5 |

Similar tables, arrived at in similar manner, have been developed for other mixtures of trichloroethylene and perchloroethylene, and others may be made for other non-azeotropic binary mixtures of organic liquids one of which boils above and the other below the desired sterilization temperature.

The critical mass velocity and the amount of excess heat required will vary with the proportions and heat load distribution of the apparatus, but for any given apparatus the value of those factors necessary to maintain the required condensing temperature at all points within a given level or zone may be determined readily. It is to be understood, of course, that said required vapor temperature cannot be maintained merely by a high heat input, but that total condensation of vapors above the desired sterilization zone must be caused to occur by effective cooling at a level just above the sterilization zone, so that no opportunity exists for any significant change in the composition of the boiling liquid. Even when partial reliance is had on cool canned goods entering the apparatus, to be preheated and to aid in condensing the upper layer of vapors, there should always be provided ample fixed auxiliary cooling surface to insure complete reflux at that level.

The herein-described method of cooking and sterilizing canned foods may be carried out batchwise, if desired, in which case the cans would be lowered into the vapor zone, effecting first nearly complete condensation of the vapors while the contents of the cans are heated to one end to auxiliary cooling means at the other. Cans passing counter-current to the vapors travel through a pre-heat zone and into a sterilizing zone (nearer the vapor inlet) in which the desired condensing temperature is maintained by maintaining the proper vapor velocity. Since many types of continuous can conveyors are known, and since the particular apparatus employed does not constitute a part of the present invention, further detail as to apparatus design is believed unnecessary here.

I claim:

1. The method which comprises providing a mixture of trichloroethylene and perchloroethylene in proportions such that the initial condensation temperature of the mixed vapors from the liquid mixture is a desired temperature of sterilization of canned foods between 90° and 115° C., boiling the mixed liquids to generate vapors therefrom, exposing canned foods to such vapors for the period of time necessary to effect sterilization and any required cooking of the foods while supplying more heat to the boiling liquid than the total of that absorbed by the cans and that lost by radiation, to provide sufficient vapor velocity to maintain a smaller differential between boiling temperature and condensing temperature, for any proportion of condensation at the sterilization level, than when the same proportion of vapor is condensed at such level with the vapor in equilibrium with its condensate, and effecting total reflux of the residual vapors at a level just above that at which the cans are sterilized, to maintain a constant composition both in the boiling liquid and in the vapor zone.

2. The method which comprises providing a mixture of from 12 to 41 per cent by volume of trichloroethylene and correspondingly from 88 to 59 per cent of perchloroethylene having an initial condensation temperature at a point correspondingly in the range from 114° to 102° C., boiling the mixed liquids to generate vapors therefrom, exposing to such vapors canned foods capable of being sterilized and cooked at said condensation temperature, for the period of time necessary to effect sterilization and any required cooking of the foods while supplying more heat to the boiling liquid than the total of that absorbed by the cans and that lost by radiation, to provide sufficient vapor velocity to maintain a smaller differential between boiling temperature and condensing temperature, for any proportion of condensation at the sterilization level, than when the same proportion of vapor is condensed at such level with the vapor in equilibrium with its condensate, and effecting total reflux of the residual vapors at a level just above that at which the cans are sterilized, to maintain a constant composition both in the boiling liquid and in the vapor zone.

3. The method which comprises providing a mixture of trichloroethylene and perchloroethylene in proportions such that the initial condensation temperature of the mixed vapors from the liquid mixture is a desired temperature of sterilization of canned foods between 90° and 115° C., boiling the mixed liquids to generate vapors therefrom, continuously introducing canned foods to and moving them through the upper level of such vapors, and thence into a vapor zone nearer the boiling liquids, at a rate to preheat the contents of the cans to the vapor temperature in the upper vapor level and to sterilize and cook said contents in the lower vapor level, and removing the cans from the vapor zone after an exposure thereto sufficient to effect the desired cooking and sterilization, while supplying more heat to the boiling liquids than the total of that absorbed by the cans and that lost by radiation, to provide sufficient vapor velocity to maintain a smaller differential between boiling temperature and condensing temperature, for any proportion of condensation at the sterilization level, than when the same proportion of vapor is condensed at such level with the vapor in equilibrium with its condensate, and effecting total reflux of the residual vapors at a level just above that at which the cans are preheated and sterilized, to maintain a constant composition both in the boiling liquid and in the vapor zone.

4. The method which comprises providing a mixture of trichloroethylene and perchloroethylene in proportions such that the initial condensation temperature of the mixed vapors from the liquid mixture is a desired temperature of sterilization of canned foods between 90° and 115° C., boiling the mixed liquids to generate vapors therefrom, exposing canned foods to such vapors for the period of time necessary to effect sterilization and any required cooking of the foods while supplying more heat to the boiling liquid than the total of that absorbed by the cans and that lost by radiation, to provide sufficient vapor velocity to maintain a smaller differential between boiling temperature and condensing temperature, for any proportion of condensation at the sterilization level, than when the same proportion of vapor is condensed at such level with the vapor in equilibrium with its condensate, and effecting total reflux of the residual vapors at a level just above that at which the cans are preheated and sterilized, to maintain a constant composition both in the boiling liquid and in the vapor zone.

5. The method which comprises providing a mixture of trichloroethylene and perchloroethylene in proportions such that the initial condensation temperature of the mixed vapors from the liquid mixture is a desired temperature of sterilization of canned foods between 90° and 115° C., boiling the mixed liquids to generate vapors therefrom, exposing canned foods to such vapors for the period of time necessary to effect sterilization and any required cooking of the foods while supplying more heat to the boiling liquid than the total of that absorbed by the cans and that lost by radiation, and effecting total reflux of the residual vapors at a level just above that at which the cans are sterilized, to maintain a constant composition both in the boiling liquid and in the vapor zone.

OREN CARLYLE CESSNA.

REFERENCES CITED

The following references are of record in the file of this patent:

UNITED STATES PATENTS

| Number | Name | Date |
|---|---|---|
| 727,575 | Birkholz | May 12, 1903 |
| 1,366,778 | Fooks | Jan. 25, 1921 |
| 1,901,083 | Chapman | Mar. 14, 1933 |